Nov. 18, 1952 — J. C. A. RECOURT ET AL — 2,618,236
COLLAPSIBLE TUNING INDICATOR FOR WIRELESS SETS
Filed Feb. 6, 1947 — 2 SHEETS—SHEET 1

INVENTORS
CORNELIS BASTIAAN LOS
JOHANNES CHRISTOFFEL ANTONIE RECOURT
BY
AGENT

Nov. 18, 1952 J. C. A. RECOURT ET AL 2,618,236
COLLAPSIBLE TUNING INDICATOR FOR WIRELESS SETS
Filed Feb. 6, 1947 2 SHEETS—SHEET 2

INVENTORS
CORNELIS BASTIAAN LOS
JOHANNES CHRISTOFFEL ANTONIE RECOURT
AGENT

Patented Nov. 18, 1952

2,618,236

UNITED STATES PATENT OFFICE 2,618,236

COLLAPSIBLE TUNING INDICATOR FOR WIRELESS SETS

Johannes Christoffel Antonie Recourt and Cornelis Bastiaan Los, Eindhoven, Netherlands, assignors to Hartford National Bank and Trust Company, Hartford, Conn., as trustee Application February 6, 1947, Serial No. 726,760
In Belgium December 15, 1944

Section 1, Public Law 690, August 8, 1946
Patent expires December 15, 1964

2 Claims. (Cl. 116—124.4)

This invention relates to a collapsible indicator dial for wireless sets constituted at least substantially by a glass plate and an index which can slide along the latter and is also collapsible, said index being lighted by two light sources which are located on each side of the plate and in the plane thereof and each of which is arranged in a cylindrical drum, these drums serving, in addition, as pivots.

The above and other features, objects and advantages of the present invention will be fully understood from the following description considered in connection with the accompanying illustrative drawings.

Figure 1:
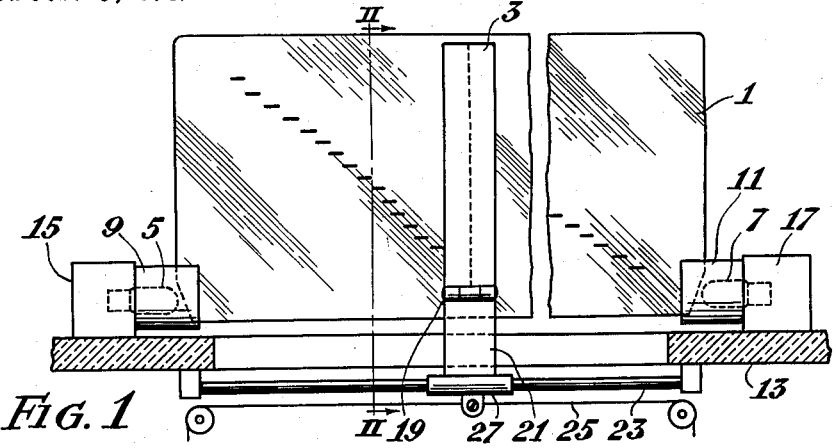
Fig. 1 shows a front elevation view of a known form of a collapsible tuning indicator for a wireless set.
Figures 2, 3, 4:
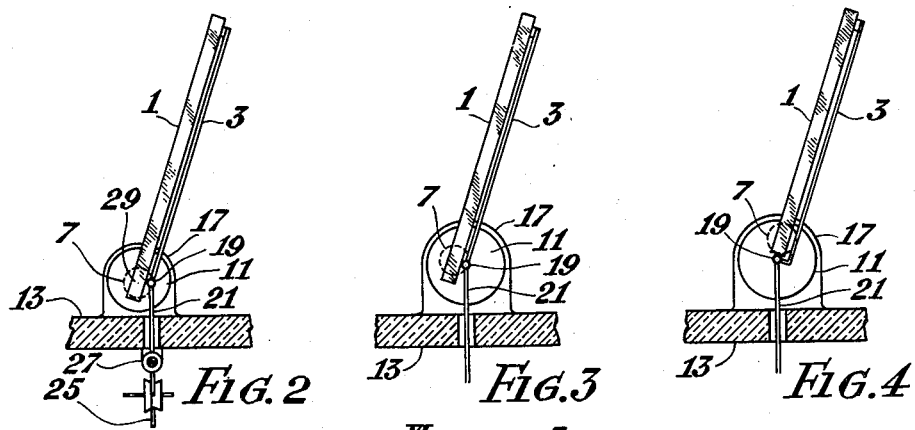
Fig. 2 is a sectional view taken along the lines II—II of Fig. 1.
Figs. 3 and 4 show cross-sectional views of other known forms of collapsible tuning indicators for wireless sets.

This type of scale is frequently used, especially in wireless receivers, on account of the practical and aesthetic advantages that can be obtained with it. A known form of construction of this tuning scale is shown in Figures 1 and 2 of the accompanying drawing. Figure 1 shows the construction of the scale in vertical section through the axis of rotation (scale itself and pivots not cut), whereas Figure 2 shows the scale in cross-section taken on the line II—II of Figure 1.

In these figures, reference numeral 1 designates a transparent glass scale plate (as viewed from the back), along which an index is slidable. The scale is lighted in known manner by two little incandescent lamps 5 and 7 which are located on each side of scale 1 and in the plane of the latter and which are housed in cylindrical drums 9 and 11 respectively, which are pivoted in sleeves or cups 15 and 17, fixed on the upper wall 13 of the wireless receiver. The index 3 is fixed, by means of a hinge 19, to an extension 21 which projects through a slit provided in wall 13 and which is supported by an index slide 27 which can move along a guide 23 and is driven by a rope 25. The index 3 is forced against scale 1 by a spring (not shown), which is provided between the index and extension 21. The axis of rotation 29, about which scale 1 turns on being folded up and down, is located in the plane of the scale.

As can be seen from Figure 2, this construction has the drawback that on folding scale 1 up and down the index 3 shifts with respect to the scale in a direction normal to the axis of rotation, in which event the distance between hinge 19 and scale 1 also varies.

In order to prevent these undesirable shifts, use was previously made of the construction shown in cross-section in Figure 3, in which the axis of rotation folding axis of the scale, instead of being located in its plane, is coincident with the pivot axis of index 3. In this case the index does not shift, but the incandescent lamp 7 must be arranged excentrically in drum 11, due to which the latter must have a diameter appreciably larger than in the construction shown in Figures 1 and 2. This results in increased cost, while it has been found in practice that aesthetic requirements also are satisfied to a smaller extent.

This drawback is also inherent to the construction shown in Figure 4, in which the axes of rotation of the scale and of the index are coincident and located in the plane of the scale plate but under its bottom edge.

In the construction according to the invention, in which the folding axes of the scale and of the index are also coincident and located in the plane of the scale plate, the said drawbacks are obviated by that the axis of rotation of the index is located in a recess of the scale plate covering at least the range through which the index can move. As appears from Figures 5 and 6, which show a practical example of a scale according to the invention similarly to Figures 1 and 2, the drawback of the construction shown in Figure 4 does not occur in this case and the pivot drums 9 and 11 may have a fairly small diameter.

Figure 5:
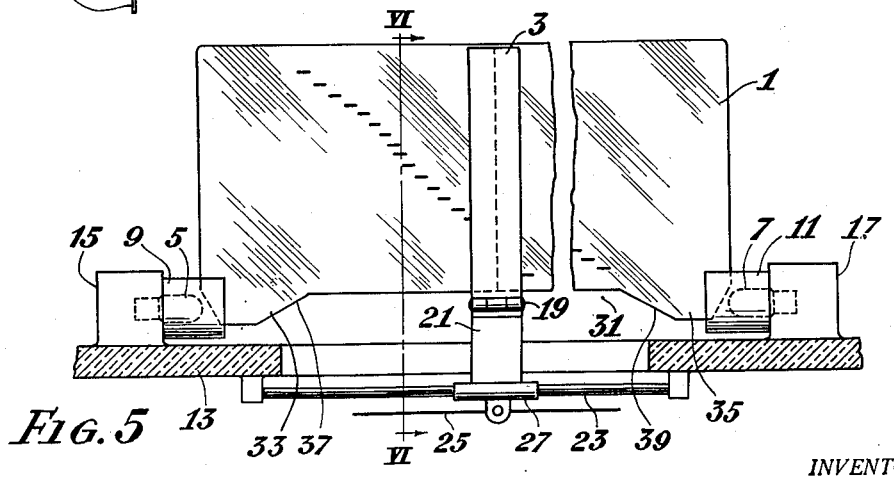
Fig. 5 shows a front elevation view of a collapsible tuning indicator for a wireless set embodying the present invention.
Figure 6:
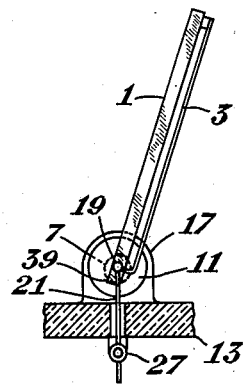
Fig. 6 is a sectional view taken along the lines VI—VI of Fig. 5.

In the construction shown in Figures 5 and 6 the recess in which the pivot axis of the index is located is constituted by a re-entrant part 31 provided along the bottom edge of scale plate 1. This shape of scale can be easily obtained by cutting and polishing. The tags 33 and 35, which subsist on each side of recess 31, intercept the light of the incandescent lamps 5 and 7 and lead it on into the scale plate.

In order to prevent light from emerging from the scale at the ends (flanks) 37 and 39 of the recess, the scale edge along these flanks is preferably coated with a reflecting substance. The recess is preferably trapezoidal in shape, as shown, due to which the light thrown on flanks 37 and 39 is reflected towards the centre of the scale.

Figure 7:
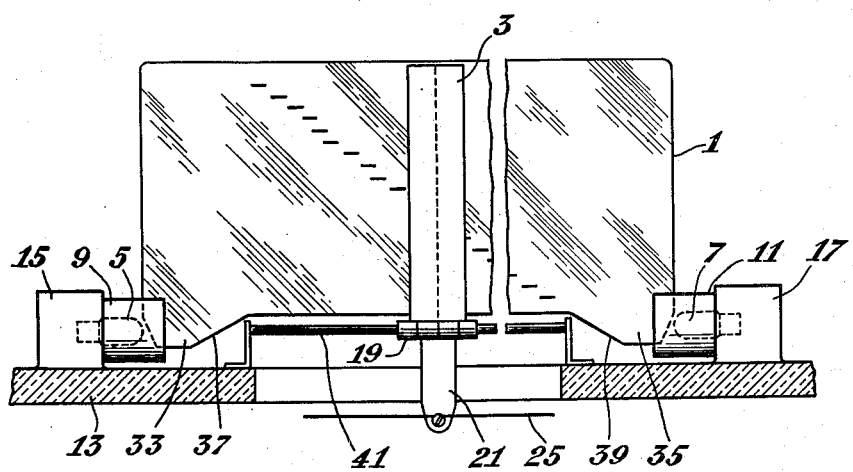
Fig. 7 shows a front elevation view of a modification of the present invention.

Figure 7 shows a second practical example of the scale according to the invention, which differs from that shown in Figures 5 and 6 in that hinge 19 between index 3 and extension 21 constitutes, in addition, an index slide and can move along a guide rod 41 which is coaxial of the hinge. In this case guide 23 may be dispensed with.

In contradistinction to Figure 7, it is alternatively possible for guide rod 41 to be fixed to the flanks 37 and 39 of recess 31 and to have a noncircular section, in which event hinge 19 is designed in such manner that index 3 collapses together with rod 41 and hence with the scale, whilst extension 21 turns freely about the rod as an axis. A spring between index 3 and extension 21 is in this case redundant.

What we claim is:

1. Tuning apparatus for a cabinet type radio receiving set, comprising a cabinet having a wall portion provided with a slot-like opening, a guide member mounted within said cabinet and extending parallel to said opening, a pair of drum-like carrier members mounted in spaced apart relationship on the top of the said wall portion along a given axis and provided with rotatable bushing portions, a tuning dial plate member having a side thereof formed with a recess to provide two spaced apart mounting portions coupled to said bushing portions and an intermediate portion spaced from the said given axis, a pointer support member slideably mounted on said guide member and extending through said slot-like opening, a hinged pointer member mounted on said support for movement therewith, said pointer being hinged approximately on the said given axis and within said recess, and means for moving the said support member and therewith said pointer along the said guide member, said dial and said pointer being rotated about said given axis so as to be collapsed against the top of the said wall portion.

2. Collapsible tuning apparatus for a cabinet type radio receiving set, comprising a cabinet having a wall portion provided with a slot-like opening, a pair of drum-like carrier members mounted in spaced apart relationship on the said wall portion along a given axis and provided with rotatable bushing portions, a transparent plate-shaped tuning dial member having a side thereof formed with a recess to provide two spaced apart mounting portions coupled to said bushing portions and an intermediate portion spaced from said given axis, a rod-like guide member mounted within said cabinet parallel to the said axis, a pointer support member slideably mounted on said guide member and extending through said slot-like opening, a resilient hinged pointer member mounted on said support for movement therewith, the axis of the hinge of the said pointer member approximately coinciding with the said given axis, a pair of lamps respectively mounted within said bushing portions adjacent the said mounting portions of the said dial member and on said axis, and belt-like means for moving the said support member and thereby said pointer along the said guide member.

JOHANNES CHRISTOFFEL
ANTONIE RECOURT.
CORNELIS BASTIAAN LOS.

REFERENCES CITED

The following references are of record in the file of this patent:

UNITED STATES PATENTS

| Number | Name | Date |
| --- | --- | --- |
| 2,485,196 | Groenenberg | Oct. 18, 1949 |
| 2,507,027 | Leeuwin | May 9, 1950 |

FOREIGN PATENTS

| Number | Country | Date |
| --- | --- | --- |
| 340,708 | Italy | May 26, 1936 |
| 376,090 | Italy | Oct. 21, 1939 |